(12) United States Patent
Lai et al.

(10) Patent No.: US 10,570,958 B1
(45) Date of Patent: Feb. 25, 2020

(54) HYDROSTATIC BEARING ASSEMBLY

(71) Applicant: Industrial Technology Research Institute, Hsinchu (TW)

(72) Inventors: Ta-Hua Lai, Taipei (TW); Jung-Huang Liao, Hsinchu County (TW); Shih-Chieh Lin, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 16/208,576

(22) Filed: Dec. 4, 2018

(30) Foreign Application Priority Data

Nov. 29, 2018 (TW) ............................. 107142797 A (51) Int. Cl.
*F16C 32/06* (2006.01)
*F16C 23/02* (2006.01)
(Continued)

(52) U.S. Cl.
CPC .......... *F16C 32/0655* (2013.01); *F16C 23/02* (2013.01); *F16C 29/025* (2013.01);
(Continued)

(58) Field of Classification Search
CPC .... F16C 23/02; F16C 29/025; F16C 32/0644; F16C 32/0655; F16C 35/02;
(Continued)

(56) References Cited

U.S. PATENT DOCUMENTS

| 3,384,425 A | 5/1968 | Brown |
| 3,758,175 A | 9/1973 | Van Roojen |

(Continued)

FOREIGN PATENT DOCUMENTS

| CN | 103831718 | 6/2014 |
| CN | 103909469 | 7/2014 |

(Continued)

OTHER PUBLICATIONS

Ta-Hua Lai et al., "Parameters design of a membrane-type restrictor with single-pad hydrostatic bearing to achieve high static stiffness," Tribology International, vol. 107, Mar. 2017, pp. 206-212.

(Continued)

*Primary Examiner* — Marcus Charles
(74) *Attorney, Agent, or Firm* — JCIPRNET (57) ABSTRACT

A hydrostatic bearing assembly including a bearing and two membrane throttles is provided. The bearing is adapted to be movably disposed on a slide rail and includes two sub-bearing portions that are disposed opposite to each other on two opposite sides of the slide rail. The two membrane throttles are adapted to be connected to a pump. The pump is adapted to supply a fluid through the two membrane throttles to flow between the two sub-bearing portions and the slide rail, and each of the membrane throttles includes a casing and a throttling membrane piece. At least one of the casing and the corresponding sub-bearing portion includes a chamber, an inlet and an outlet communicating with the chamber, and an outlet surface, wherein the pump is adapted to be connected to the inlet, and the slide rail is adapted to be disposed adjacent to the outlet. The throttling membrane piece is being positioned in the chamber covers on the outlet surface.

20 Claims, 10 Drawing Sheets

(51) Int. Cl.
  *F16C 29/02* (2006.01)
  *F16K 47/14* (2006.01)
(52) U.S. Cl.
  CPC ...... *F16C 32/0644* (2013.01); *F16C 2240/02* (2013.01); *F16C 2240/30* (2013.01); *F16K 47/14* (2013.01)
(58) Field of Classification Search
  CPC .............. F16C 32/0664; F16C 32/0666; F16C 32/0696; F16C 2322/39; F16C 2240/02; F16C 2240/30; F16K 47/14
  USPC ...................................... 384/12, 99, 121, 13
  See application file for complete search history.

(56) References Cited

U.S. PATENT DOCUMENTS

| | | | | |
|---|---|---|---|---|
| 3,899,222 | A | * | 8/1975 | Mendelevsky ..... F16C 32/0651 384/12 |
| 4,809,354 | A | * | 2/1989 | Kawashima .......... F16C 29/025 384/114 |
| 4,915,510 | A | * | 4/1990 | Arvidsson ............... F16C 23/02 384/121 |
| 5,010,794 | A | * | 4/1991 | Klager ................... B23Q 5/261 384/107 |
| 5,484,208 | A | * | 1/1996 | Kane ..................... F16C 29/025 384/12 |
| 5,743,654 | A | | 4/1998 | Ide et al. |
| 6,076,548 | A | | 6/2000 | Schonfeld |
| 6,086,255 | A | * | 7/2000 | Lyon ....................... F16C 32/06 384/100 |
| 6,276,491 | B1 | | 8/2001 | Schonfeld |
| 7,101,080 | B2 | | 9/2006 | Kobayashi et al. |
| 8,172,531 | B2 | * | 5/2012 | Wadehn ................ F03D 1/0658 384/100 |
| 8,485,729 | B2 | * | 7/2013 | Huang ................ F16C 32/0648 384/100 |
| 9,765,817 | B1 | * | 9/2017 | Chen ................... F16C 33/1045 |
| 10,054,161 | B1 | * | 8/2018 | Lai ....................... F16C 32/0644 |
| 2006/0098904 | A1 | * | 5/2006 | Link .................... D21G 1/0226 384/100 |
| 2016/0186802 | A1 | | 6/2016 | Hashimoto |

FOREIGN PATENT DOCUMENTS

| | | | | |
|---|---|---|---|---|
| DE | 2538226 | A1 | * 3/1977 | .......... F16C 32/0622 |
| DE | 102015122517 | A1 | * 6/2016 | ............ F16C 29/025 |
| GB | 2122273 | | 1/1984 | |
| JP | 2009185926 | | 8/2009 | |
| JP | 2013087875 | | 5/2013 | |
| RU | 1448137 | A | * 12/1998 | .............. F16C 32/06 |
| SU | 1712692 | A2 | * 2/1992 | .............. F16C 32/06 |
| TW | 225576 | | 6/1994 | |
| TW | M261624 | | 4/2005 | |
| TW | I279661 | | 4/2007 | |
| TW | I299014 | | 7/2008 | |
| TW | M348658 | | 1/2009 | |
| TW | I332878 | | 11/2010 | |
| TW | I334191 | | 12/2010 | |
| TW | 201137554 | | 11/2011 | |
| TW | I363943 | | 5/2012 | |
| TW | I412673 | | 10/2013 | |
| TW | I442204 | | 6/2014 | |
| TW | I450062 | | 8/2014 | |
| TW | I458586 | | 11/2014 | |
| TW | I641768 | | 11/2018 | |
| TW | 201903297 | | 1/2019 | |

OTHER PUBLICATIONS

De Gast, J. G.C., "A new type of controlled restrictor (m.d.r.) for double film hydrostatic bearings and its application to high-precision machine tools," Advance in Mach. Tool Des. and Res. Proc of the 7th Int. MDTR Comf, 1996, pp. 273-298.

O'Donoghue et al., "Hydrostatic bearing design: Supplement for unequal opposed pads.," Tribology, vol. 2, Issue 4, Nov. 1969, pp. 225-232.

Cusano, C., "Characteristics of externally pressurized journal bearings with membrance-type variable-flow restrictors as compensating elements," Proceedings of the Institution of Mechanical Engineers, vol. 188, Jun. 1, 1974, pp. 527-536.

Mohsin, M. E., "The use of controlled restrictors for compensating hydrostatic bearings," Advance in Mach. Tool Des. and Res., Proc of the 3rd Int. MDTR Comf., 1962, pp. 429-442.

Feili, H. R. et al., "Risk analysis of geothermal power plants using failure modes and effects analysis (FMEA) technique," Energy Conversion and Management, vol. 72, Aug. 2013, pp. 69-76.

Dhurvey, S. et al., "Preventive maintenance of steam turbine used in thermal power plant by reliability investigation and FMEA," International Journal of Science and Research, vol. 7, Issue 6, Jun. 2018, pp. 18-22.

Jia-Wei Lu,"A Novel Design of Pressure-sense-compensating Hydrostatic Bearing and Experimental Verification", Thesis of Master Degree, NTHU, Jul. 2011, pp. 1-113.

"Office Action of Taiwan Counterpart Application," dated Oct. 5, 2019, p. 1-p. 6.

* cited by examiner

HYDROSTATIC BEARING ASSEMBLY

CROSS-REFERENCE TO RELATED APPLICATION

This application claims the priority benefit of Taiwan application serial no. 107142797, filed on Nov. 29, 2018. The entirety of the above-mentioned patent application is hereby incorporated by reference herein and made a part of this specification.

TECHNICAL FIELD

The disclosure is related to a hydrostatic bearing assembly.

BACKGROUND

In order to achieve better stability, high stiffness, and good damping capacity when a sliding or rotating mechanical structure is in operation, the technique of membrane-compensated hydrostatic bearing is introduced to achieve the above objects, and a general complete membrane-compensated hydrostatic bearing module contains an fluid supply system (pump), a bearing, and a membrane throttle. A fluid having a certain pressure supplied by the external fluid supply system is delivered in a fluid chamber of the bearing adjacent to a slide rail surface via the membrane throttle, and fluid film is formed between the bearing and the slide rail to separate slide bearing surfaces in contact with each other to achieve a hydrostatic lubrication effect. In order to further improve the accuracy, a membrane-compensated opposed-pad hydrostatic bearing is introduced. However, the prior art does not further study the paired structural parameters of pairs of membrane-compensated hydrostatic modules in the membrane-compensated opposed-pad hydrostatic bearing.

The difference in the configuration and size of the two membrane throttles in the membrane-compensated opposed-pad hydrostatic bearing changes the resisting characteristics thereof, thus affecting the adjustment effect of the chamber pressure, and therefore the performance design of the membrane-compensated opposed-pad hydrostatic bearing is significantly affected. How to provide the membrane throttles in the membrane-compensated opposed-pad hydrostatic bearing with good performance is the direction that the field urgently needs to explore.

SUMMARY

An embodiment of the disclosure provides a hydrostatic bearing assembly that optimizes the design of a membrane-compensated opposed-pad hydrostatic bearing such that membrane throttles in the membrane-compensated opposed-pad hydrostatic bearing have good performance.

The hydrostatic bearing assembly of an embodiment of the disclosure is adapted to be connected to a pump and adapted to be disposed on a slide rail, wherein the pump is adapted to supply a fluid. A hydrostatic bearing assembly including a bearing and two membrane throttles is provided. The bearing is adapted to be movably disposed on a slide rail and includes two sub-bearing portions disposed opposite to each other on two opposite sides of the slide rail. The two membrane throttles are adapted to be connected to the pump, the pump is adapted to supply a fluid through the two membrane throttles to flow between the two sub-bearing portions and the slide rail, and each of the membrane throttles includes a casing and a throttling membrane piece. At least one of the casing and the corresponding sub-bearing portion includes a chamber, an inlet and an outlet communicating with the chamber, and an outlet surface, wherein the pump is adapted to be connected to the inlet, and the slide rail is disposed adjacent to the outlet. The throttling membrane piece is positioned in the chamber covers on the outlet surface.

Based on the above, the hydrostatic bearing assembly according to an embodiment of the disclosure has two membrane throttles disposed at two opposite sides of the slide rail. The two membrane throttles disposed opposite to each other make the overall stiffness performance of the hydrostatic bearing assembly better and the hydrostatic bearing assembly may withstand a greater load.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
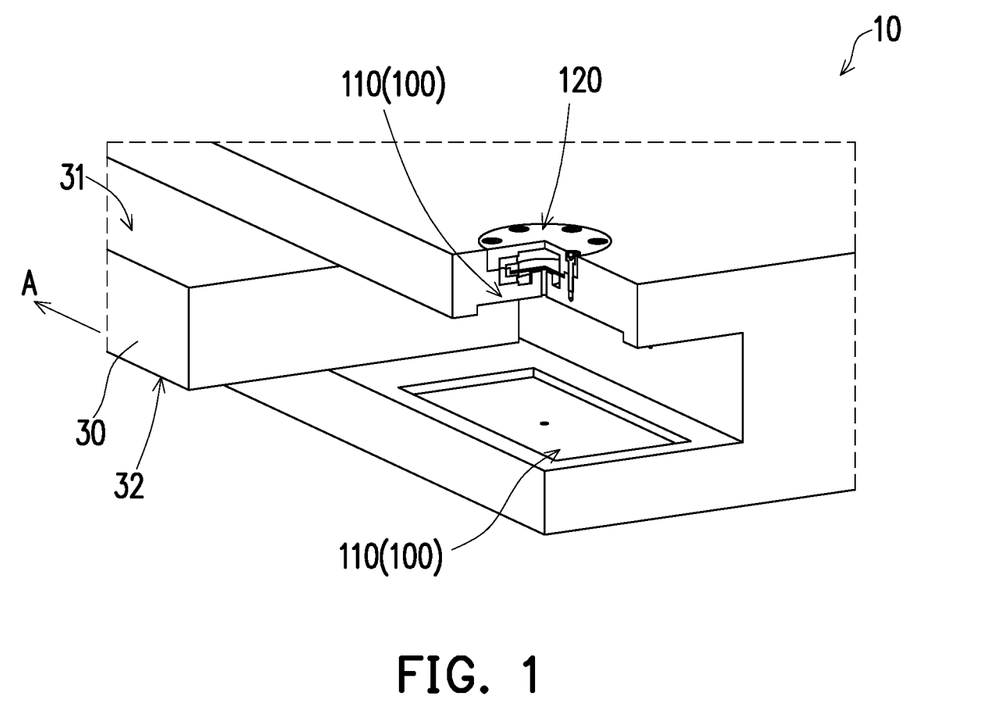
FIG. 1 is a schematic of a hydrostatic bearing assembly according to an embodiment of the disclosure.
Figure 2A:
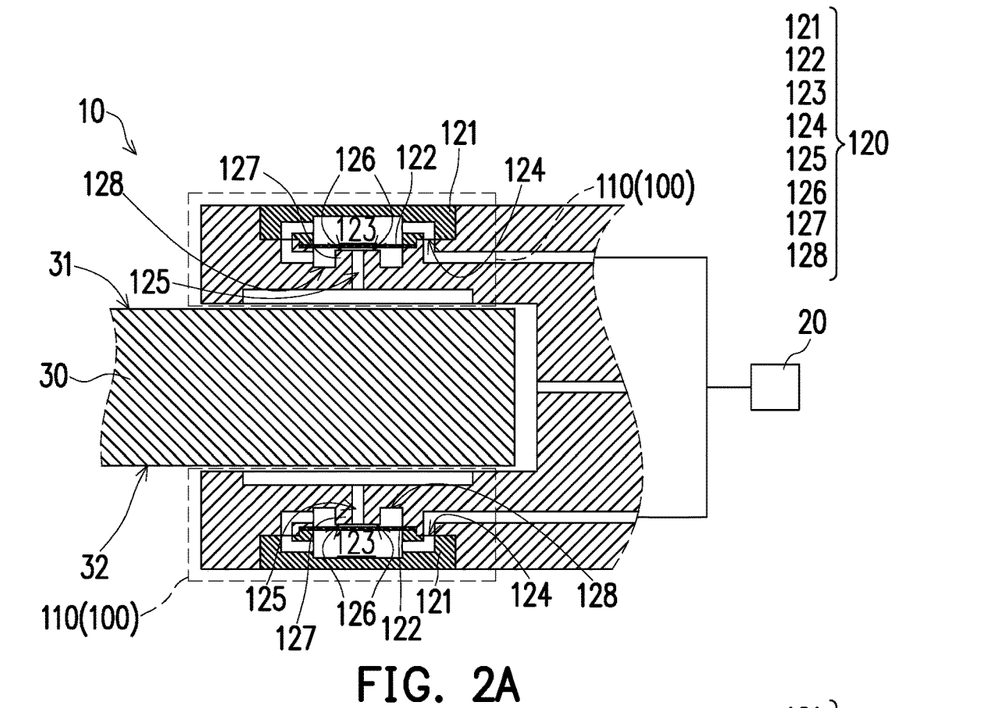
FIG. 2A and FIG. 2B are respectively schematics of the configuration of two hydrostatic bearing modules in a hydrostatic bearing assembly according to an embodiment of the disclosure.
Figure 2B:
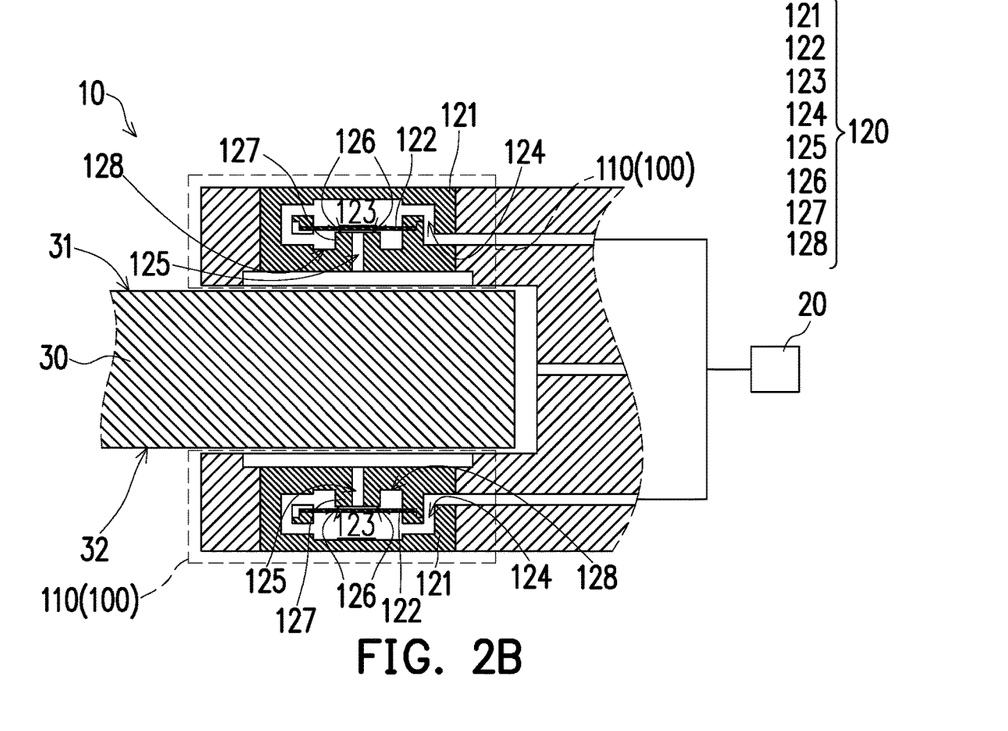

FIG. 1 is a schematic of a hydrostatic bearing assembly according to an embodiment of the disclosure. FIG. 2A and FIG. 2B are respectively schematics of the configuration of two hydrostatic bearing modules in a hydrostatic bearing assembly according to an embodiment of the disclosure. Referring to FIG. 1, FIG. 2A, and FIG. 2B, a hydrostatic bearing assembly 10 of the present embodiment is connected to a pump 20 (shown in FIG. 2A and FIG. 2B) and a slide rail 30. The hydrostatic bearing assembly 10 includes a bearing 100 and two membrane throttles 120. In the present embodiment, the bearing 100 is, for example, a U-shaped bearing, and two sub-bearing portions 110 of the bearing 100 are disposed opposite to each other on two opposite sides of the slide rail 30. In FIG. 1, a portion of the hydrostatic bearing assembly 10 and the slide rail 30 are schematically shown. The hydrostatic bearing assembly 10 is a linear-motion opposed-pad hydrostatic bearing assembly disposed at an upper surface 31 and a lower surface 32 of the slide rail 30 extended along an axial direction A and performs linear motion with respect to the slide rail 30. However, in other embodiments to be described later, the form of motion of the hydrostatic bearing assembly is not limited thereto.

It is worth mentioning that, in the present embodiment, the membrane throttles 120 of the bearing 100 are integrated with the sub-bearing portions 110 to form hydrostatic bearing modules movably disposed on the slide rail 30, and the membrane throttles 120 are detachably disposed on the slide rail 30. In the embodiment of FIG. 2A, each of the membrane throttles 120 includes a casing 121, wherein the casing 121 may form a chamber 123 of the membrane throttles 120 with the corresponding sub-bearing portion 110. In the embodiment of FIG. 2B, the chamber 123 of the membrane throttles 120 is directly formed by the casing 121, the sub-bearing portions 110 have a perforation, the casing 121 is located within the perforation, and the sub-bearing portions 110 are compactly disposed around the casing 121. Conventional membrane throttles are larger and therefore may only be disposed outside the bearing and are difficult to be integrated with the bearing as a slider. Even if the membrane throttles and the bearing are to be integrated, the design parameters of the membrane throttles may not achieve good performance just by proportional reduction. Therefore, in the present embodiment, the membrane throttles 120 are integrated with the sub-bearing portions 110 and relevant design parameters are provided at the same time to ensure that the hydrostatic bearing assembly 10 of the present embodiment provides good stiffness performance when reduced in size. At the same time, since the membrane throttles 120 of the present embodiment are detachable, membrane throttles with suitable parameters may be more conveniently replaced in conjunction with design requirements.

Figure 3:
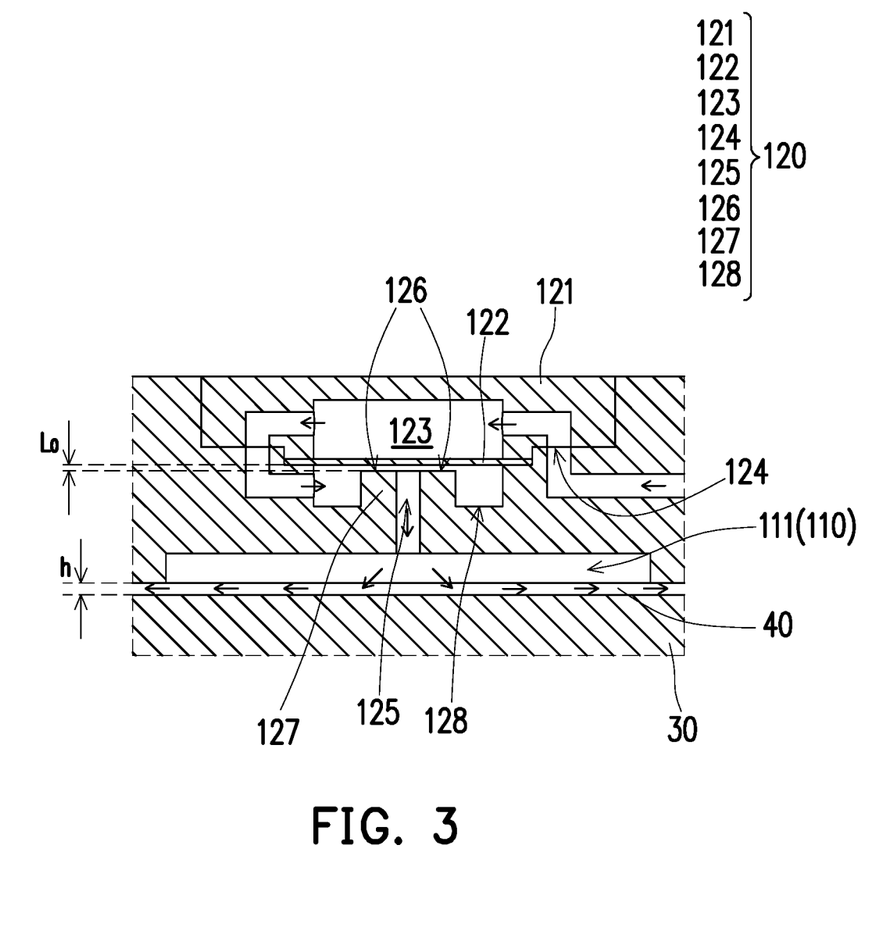
FIG. 3 is an enlarged schematic of the hydrostatic bearing module of FIG. 2A.

FIG. 3 is an enlarged schematic of the hydrostatic bearing module of FIG. 2A. Referring to FIG. 2A, FIG. 2B, and FIG. 3, each of the membrane throttles 120 further includes a throttling membrane piece 122, an inlet 124 and an outlet 125 communicating with the chamber 123, an outlet surface (restricting plane) 126, a protruding portion 127, and a bottom surface 128. The pump 20 is adapted to be connected to the inlet 124 and the slide rail 30 is adapted to be disposed adjacent to the outlet 125. The projecting portion 127 is protruded toward the throttling membrane piece 122 and the outlet 125 penetrates the protruding portion 127. The throttling membrane piece 122 is located inside the chamber 123 to partition the chamber 123 into upper and lower portions, and the upper and lower portions are communicated at the left. A throttling membrane piece 122 being positioned in the chamber 123 covers on the outlet surface 126. As may be seen in FIG. 3, the outlet surface 126 is the inner surface of the protruding portion 127 surrounding the outlet 125 and facing the throttling membrane piece 122, and the outlet surface 126 is closer to the throttling membrane piece 122 than the bottom surface 128 at both sides thereof. In the case where the inlet 124 is not supplied with fluid, the distance between the throttling membrane piece 122 and the outlet surface 126 is $L_0$, and the distance $L_0$ may be regarded as the distance between the protruding portion 127 of the casing 121 adjacent to the outlet 125 and the throttling membrane piece 122, which is also called the assembling clearance. When the inlet 124 has actual fluid supply, the combined pressure of the upper portion of the chamber 123 is always greater than the combined pressure of the lower portion, and since the throttling membrane piece 122 is flexible, the throttling membrane piece 122 has a downwardly convex pre-deformation $x_0$. That is, the distance between the throttling membrane piece 122 and the outlet surface 126 is $L_0-x_0$ (less than the distance $L_0$).

It should be noted that, FIG. 3 only schematically shows how the fluid flows through the membrane throttles 120 and between the bearing 100 and the slide rail 30, and the membrane throttles 120 are shown above the slide rail 30. However, the relative positions of the membrane throttles 120 and the sub-bearing portions 110 are not limited as long as the membrane throttles 120 and the sub-bearing portions 110 have a path for fluid to flow.

The structure and operation of a single sub-bearing portion 110 and the slide rail 30 are described below.

In the present embodiment, the pump 20 is adapted to supply a fluid (for example, lubricating oil or water) to flow through the membrane throttles 120 between a fluid chamber 111 of the sub-bearing portions 110 and the slide rail 30 to form a fluid film 40 between the fluid chamber 111 of the sub-bearing portion 110 and the slide rail 30 to effectively reduce the friction of the sub-bearing portion 110 when sliding with respect to the slide rail 30. Thus, the sub-bearing portion 110 may be slid easily and smoothly with respect to the slide rail 30. More specifically, the path of the fluid (hereinafter referred to as fluid) supplied from the pump 20 enters the membrane throttles 120 from the inlet 124 of the casing 121, flows from the upper half of the chamber 123 to the lower half of the chamber 123, the lubricating oil passes between the throttling membrane piece 122 and the outlet surface 126, exits the membrane throttles 120 from the outlet 125 and flows toward the sub-bearing portion 110, enters the fluid chamber 111 of the sub-bearing portion 110, and forms a fluid film 40 between the sub-bearing portion 110 and the slide rail 30.

In general, the fluid film 40 between the sub-bearing portion 110 and the slide rail 30 needs to be maintained at a certain thickness, but since the sub-bearing portion 110 carries other objects (not shown) on top, when the sub-bearing portion 110 is loaded by an external force, a thickness h of the fluid film 40 between the sub-bearing portion 110 and the slide rail 30 may be changed. For example, the thickness h of the fluid film 40 between the sub-bearing portion 110 and the slide rail 30 is reduced when the sub-bearing portion 110 is subjected to a greater load, so that the pressures of the fluid chamber 111 of the sub-bearing portion 110 and the lower half of the chamber 123 are increased, the degree of downward convexity of the throttling membrane piece 122 is reduced, and the distance between the throttling membrane piece 122 and the outlet surface 126 is increased (that is, greater than the distance $L_0-x_0$), causing the fluid more easily passes through and flows out of the membrane throttles 120 and flows toward the sub-bearing portion 110 to increase the thickness h of the fluid film 40 between the sub-bearing portion 110 and the slide rail 30.

Similarly, when the sub-bearing portion 110 is subjected to a smaller load, the thickness h of the fluid film 40 between the sub-bearing portion 110 and the slide rail 30 is increased, so that the pressures of the fluid chamber 111 of the sub-bearing portion 110 and the lower half of the chamber 123 are reduced, the corresponding degree of downward convexity of the throttling membrane piece 122 is increased, and the distance between the throttling membrane piece 122 and the outlet surface 126 is reduced (that is, less than the distance $L_0-x_0$), causing the fluid less readily passes through, and the amount of the fluid flowing out of the membrane throttles 120 is reduced to reduce the thickness h of the fluid film 40 between the sub-bearing portion 110 and the slide rail 30.

That is, since the throttling membrane piece 122 of the membrane throttles 120 may be correspondingly deformed to change the flow resistance and flow rate of the fluid flowing through the membrane throttles 120, a feedback effect is achieved. Of course, in addition to the throttling membrane piece 122, the membrane throttles 120 have other parameters that are also important. These parameters allow the sub-bearing portion 110 to have good stiffness, such that a certain thickness of the fluid film is maintained between the sub-bearing portion 110 and the slide rail 30 even when carrying an object. In the present embodiment, the hydrostatic bearing assembly 10 is an opposed-pad hydrostatic bearing assembly, and via a specific parameter design, the two membrane throttles 120 may effectively allow a certain thickness of the fluid film 40 to be maintained between the two sub-bearing portions 110 and the slide rail 30. That is, the sub-bearing portions 110 of the bearing 100 of the opposed-pad-type hydrostatic bearing assembly 10 may still maintain the desired thickness h of the fluid film 40 when subjected to a large load.

Referring to FIG. 1 and FIG. 3, in the present embodiment, in order to allow the two sub-bearing portions 110 to stably carry a load, the two fluid chambers 111 of the two sub-bearing portions 110 are at least partially overlapped when projected on the upper surface 31 or the lower surface 32 of the slide rail 30. More preferably, as seen in FIG. 2A and FIG. 2B, the two outlets 125 of the two membrane throttles 120 disposed opposite to each other at the slide rail 30 are located on the same straight line. With the above configuration, the hydrostatic bearing assembly 10 may further provide good load balance and high stiffness.

It is worth mentioning that, in order to avoid the numerical difference caused by the difference in the unit when the hydrostatic bearing assembly 10 is studied, the load of the sub-bearing portions 110 is presented in a dimensionless manner, and the dimensionless load of the sub-bearing portions 110 is $W/A_e p_s$, wherein W is the load of the sub-bearing portions 110, $A_e$ is the equivalent area of the bearing, and $p_s$ is the hydraulic pressure supplied by the pump 20. Similarly, in order to avoid a numerical difference caused by a difference in the unit, the ratio of the actual fluid film thickness h/the preset fluid film thickness $h_0$ is expressed. It should be noted that $h_0$ is a preset value and is therefore not indicated in the figures. Similarly, in order to avoid a difference in unit and normalize the design parameters of the membrane throttles 120, the design restricting ratio λ of the membrane throttles 120 and the dimensionless stiffness $K_r^*$ of the throttling membrane piece 122 inside the membrane throttles 120 are the first things to be discussed in the present embodiment. In particular, the design restricting ratio $\lambda=R_n/R_0$, wherein $R_n$ is the flow resistance of the fluid flowing through the outlet surface 126 when the distance between the throttling membrane pieces 122 and the outlet surface 126 is $L_0$, that is, the flow resistance of the fluid flowing through the outlet surface 126 when the pressure of the chamber 123 of the upper portion of the chamber 123 of the throttling membrane piece 122 is equal to the pressure of the lower outlet 125; it may also be regarded as the equivalent flow resistance of the outlet surface 126 below the assembling clearance. Since the flow resistance of the outlet surface 126 is significantly greater than the flow resistance of other paths inside the membrane throttles 120, the flow resistance of the outlet surface 126 may be regarded as the flow resistance of the membrane throttles 120. $R_0$ is the predetermined flow resistance of the fluid flowing through the sub-bearing portions 110, and is inversely proportional to the cube of the thickness h of the fluid film 40. In addition, the dimensionless stiffness $K_r^*$ may be defined by $K_r^*=K_r L_0/(p_s A_r)$. $K_r$ is the stiffness coefficient of the throttling membrane pieces 122. $p_s$ is the hydraulic pressure supplied by the pump 20, also known as supply pressure. $A_r$ is the effective area of the outlet surface 126.

Further explanation of the different parameter settings of the present embodiment is given below.

In the present embodiment, the design restricting ratios of the membrane throttles 120 in the upper and lower bearings 100 are made the same, and the dimensionless stiffness of the two throttling membrane pieces 122 inside the two membrane throttles 120 is respectively represented by $K_{r1}^*$ and $K_{r2}^*$. FIG. 4 to FIG. 11 respectively show the relationship of dimensionless load $W/A_e p_s$ and actual fluid film thickness h/preset fluid film thickness $h_0$ of the sub-bearing portions 110 of the two membrane throttles 120 disposed opposite to each other in the hydrostatic bearing assembly of FIG. 2A in all of the pairing combinations when $K_{r1}^*$ and $K_{r2}^*$ (in the two hydrostatic bearing modules, the dimensionless stiffness of the membrane throttle of the upper hydrostatic bearing module is $K_{r1}^*$, and the dimensionless stiffness of the membrane throttle of the lower hydrostatic bearing module is $K_{r2}^*$) are respectively 1.33, 1.5, and 2.0 and the design restricting ratio λ is 0.1, 0.25, 0.35, and 1.0. A dimensionless load $W/A_e p_s$ of 1 of the sub-bearing portions 110 indicates the maximum amount of load of the bearing, and a dimensionless load $W/A_e p_s$ of −1 of the sub-bearing portions 110 indicates the maximum amount of stretch of the bearing. In the present embodiment, when the actual fluid film thickness h/preset fluid film thickness $h_0$ is around 1, the hydrostatic bearing assembly 10 may desirably control the thickness of the fluid film 40, so that the hydrostatic bearing assembly 10 remains at a stable height. Therefore, if the dimensionless load $W/A_e p_s$ (horizontal axis) of the sub-bearing portions 110 may keep the actual fluid film thickness h/preset fluid film thickness $h_0$ (vertical axis) around 1 in a greater range, it presents that these design parameters have better performance.

Referring to FIG. 4 to FIG. 11, it may be seen that compared with the design restricting ratio λ=1.0 or the design restricting ratio λ=0.1, when the design restricting ratio λ=0.25 and the design restricting ratio λ=0.35, the dimensionless load $W/A_e p_s$ (horizontal axis) may have a greater range so that the actual fluid film thickness h/preset fluid film thickness $h_0$ (vertical axis) is kept within a fixed range around 1, that is, the range of the design restricting ratio λ has good performance when 0.25≤λ≤0.35, so as to provide good stiffness to the hydrostatic bearing assembly 10. In addition, the range of the dimensionless stiffness $K_{r1}*$ and $K_{r2}*$ of the membrane throttles 120 is preferably 1.33≤ $(K_{r1}*, K_{r2}*)$≤2, and in the present embodiment, all pairing combinations when $K_{r1}*$ and $K_{r2}*$ are respectively 1.33, 1.5, and 2.0 are accordingly used.

Figure 4:
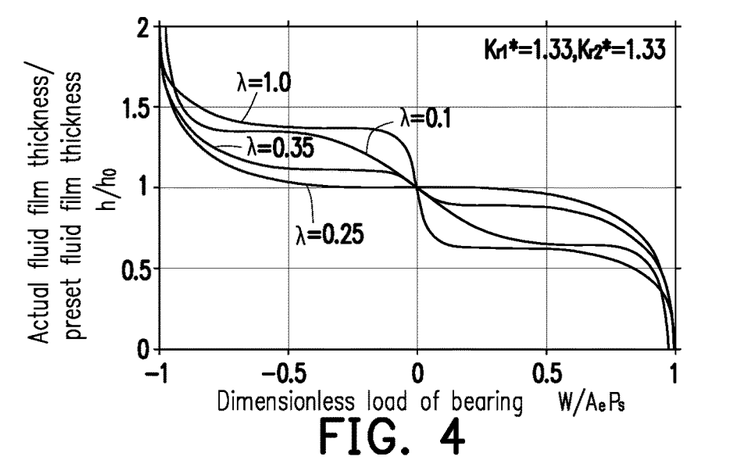
FIG. 4 to FIG. 11 respectively show the relationship of dimensionless load $W/A_e p_s$ and actual fluid film thickness $h$/preset fluid film thickness $h_0$ of sub-bearing portions 110 of two membrane throttles 120 disposed opposite to each other in the hydrostatic bearing assembly of FIG. 2A in all of the pairing combinations when $K_{r1}^*$ and $K_{r2}^*$ (the dimensionless stiffness of one of the two hydrostatic bearing modules is $K_{r1}^*$ and the other is $K_{r2}^*$) are respectively 1.33, 1.5, and 2.0 and the design restricting ratio $\lambda$ is 0.1, 0.25, 0.35, and 1.0.
Figure 5:
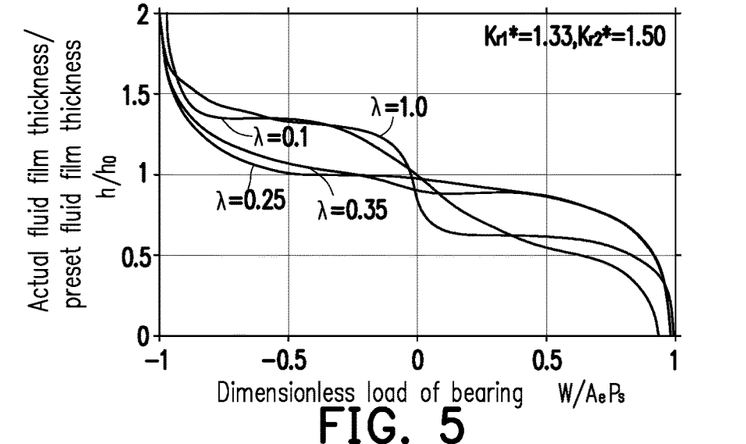
Figure 6:
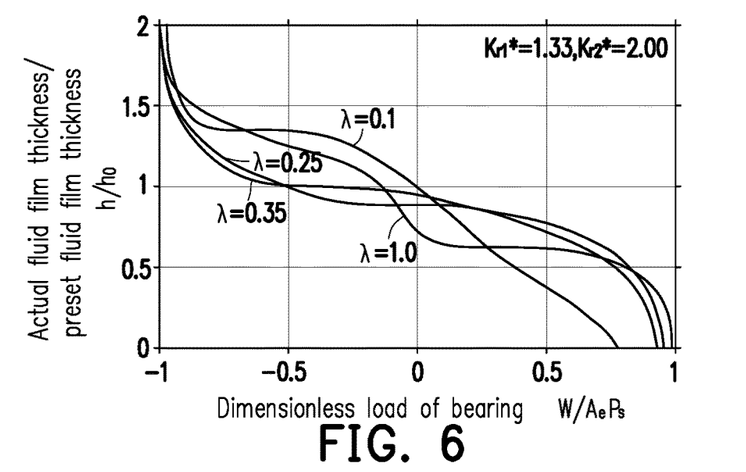
Figure 7:
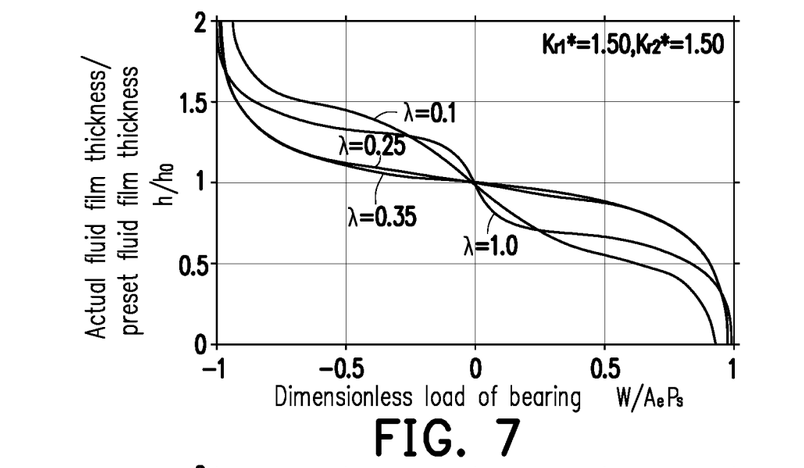
Figure 8:
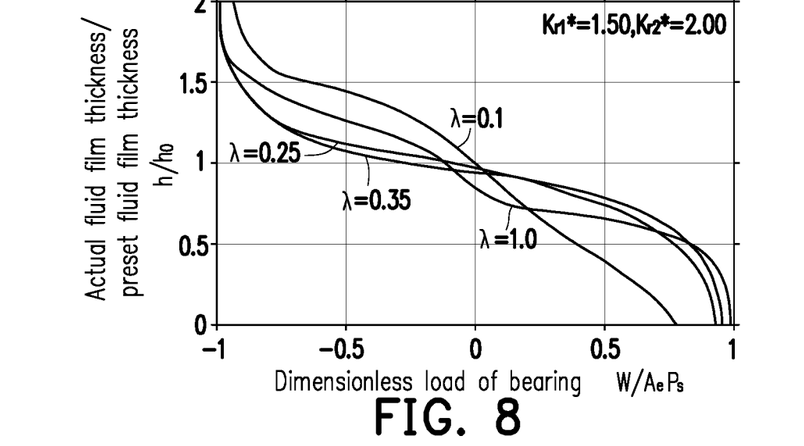
Figure 9:
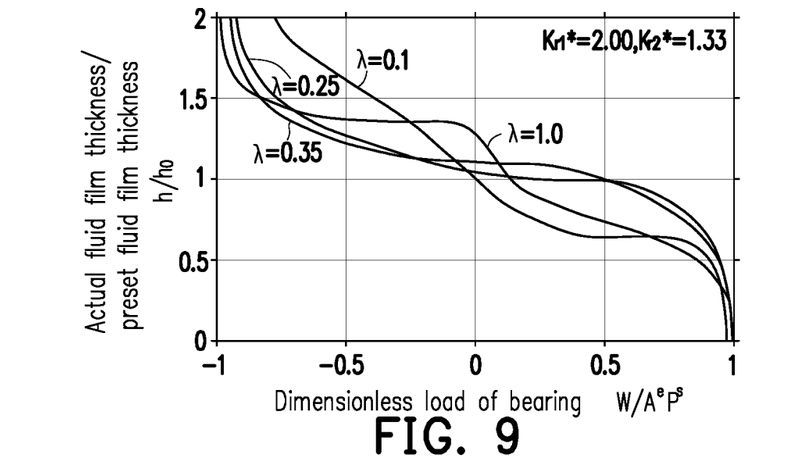
Figure 10:
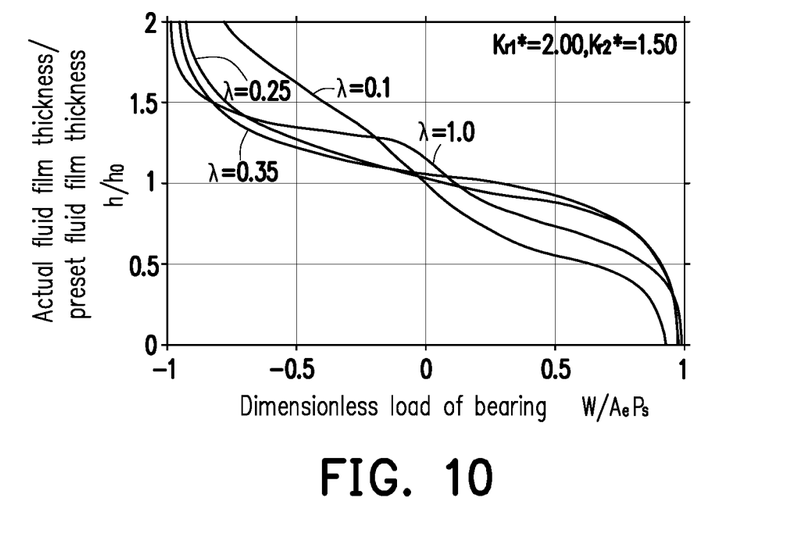
Figure 11:
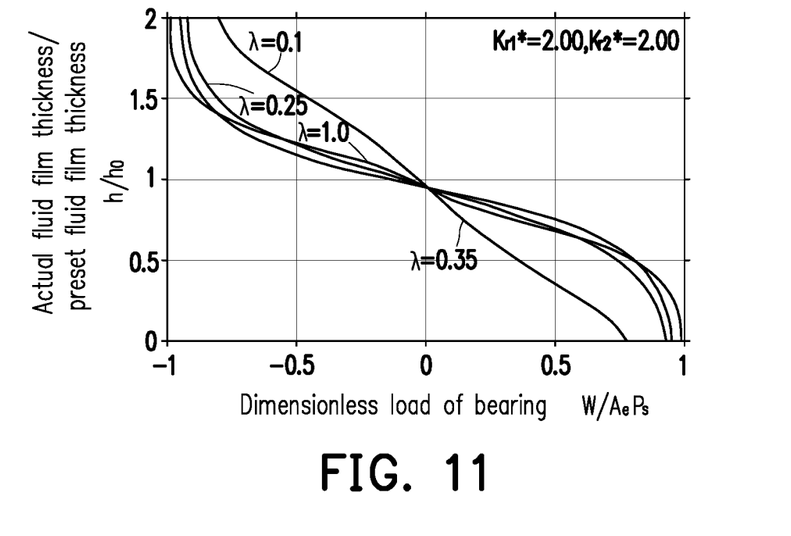

Preferably, as shown in FIG. 4, when the design restricting ratio of the membrane throttles 120 is λ=0.25 and the dimensionless stiffness $K_{r1}*$ and the dimensionless stiffness $K_{r2}*$ of the throttling membrane pieces 122 is 1.33, a dimensionless load $W/A_e p_s$ of the sub-bearing portions 110 between −0.5 and 0.5 allows the actual fluid film thickness h/preset fluid film thickness $h_0$ (vertical axis) to be close to 1 which presents the best stiffness performance. In other words, in the present embodiment, the two membrane throttles 120 disposed opposite to each other in the hydrostatic bearing assembly 10 are designed to have a design restricting ratio λ of 0.25, and the dimensionless stiffness $K_r*$ of both the two throttling membrane pieces 122 of the two membrane throttles 120 is 1.33, and therefore a certain thickness of the fluid film may be maintained between the sub-bearing portions 110 and the slide rail 30, and the optimum stiffness may be provided to the sub-bearing portions 110 of the bearing 100.

Figure 12:
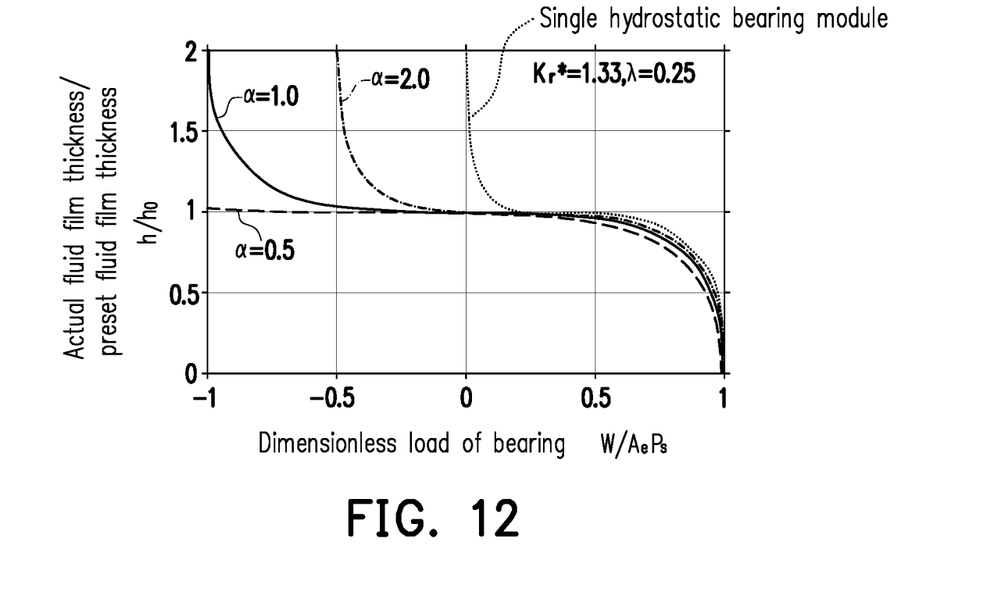
FIG. 12 shows the relationship of dimensionless load $W/A_e p_s$ and actual fluid film thickness $h$/preset fluid film thickness $h_0$ of the sub-bearing portions 110 when the design restricting ratio $\lambda$ is 0.25 for the two membrane throttles in the hydrostatic bearing assembly of FIG. 2A and the dimensionless stiffness $K_{r1}^*$ and $K_{r2}^*$ of the throttling membrane piece are 1.33, and $\alpha$ is 0.5, 1.0, and 2.0 and the hydrostatic bearing module of a single oil throttling membrane piece formed by only a single membrane throttle, the design restricting ratio $\lambda$ of which is 0.25, is disposed on the slide rail and the dimensionless stiffness of the throttling membrane piece $K_r^*$ is 1.33.
Figure 15:
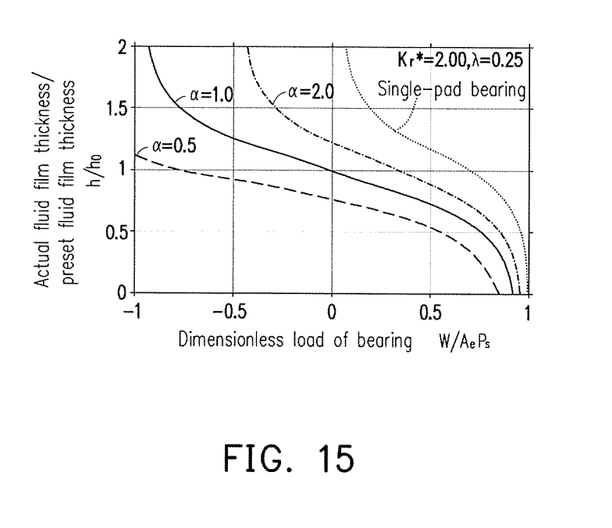
FIG. 15 shows the relationship of dimensionless load $W/A_e p_s$ and actual fluid film thickness $h$/preset fluid film thickness $h0$ of the sub-bearing portions 110 when the design restricting ratio $\lambda$ is 0.25 for the two membrane throttles in the hydrostatic bearing assembly of FIG. 2A and the dimensionless stiffness Kr1* and Kr2* of the throttling membrane piece are 2.00, and α is 0.5, 1.0, and 2.0 and the hydrostatic bearing module of a single oil throttling membrane piece formed by only a single membrane throttle, the design restricting ratio λ of which is 0.25, is disposed on the slide rail and the dimensionless stiffness of the throttling membrane piece $K_r^*$ is 2.00.

In the disclosure, an equivalent area ratio α of the two sub-bearing portions 110 disposed opposite to each other is also provided, wherein the equivalent area ratio $α=A_{e1}/A_{e2}$, $A_{e1}$ is the equivalent area of one of the two sub-bearing portions 110 disposed opposite to each other, and $A_{e2}$ is the equivalent area of the other of the two sub-bearing portions 110 disposed opposite to each other. FIG. 12 shows the relationship of dimensionless load $W/A_e p_s$ and actual fluid film thickness h/preset fluid film thickness $h_0$ of the sub-bearing portions 110 (wherein $A_e$ represents $A_{e1}$) when the design restricting ratio λ is 0.25 for the two membrane throttles in the hydrostatic bearing assembly of FIG. 2A and the dimensionless stiffness $K_{r1}*$ and $K_{r2}*$ of the throttling membrane piece are 1.33, and the equivalent area ratio α is 0.5, 1.0, and 2.0 and the hydrostatic bearing module of the fluid film formed by only a single membrane throttle, the design restricting ratio λ of which is 0.25, is disposed on the slide rail and the dimensionless stiffness $K_r*$ of the throttling membrane piece is 1.33. FIG. 15 shows the relationship of dimensionless load $W/A_e p_s$ and actual fluid film thickness h/preset fluid film thickness $h_0$ of the sub-bearing portions 110 (wherein $A_e$ represents $A_{e1}$) when the design restricting ratio λ is 0.25 for the two membrane throttles in the hydrostatic bearing assembly of FIG. 2A and the dimensionless stiffness $K_{r1}*$ and $K_{r2}*$ of the throttling membrane piece are 2.00, and the equivalent area ratio α is 0.5, 1.0, and 2.0 and the hydrostatic bearing module of the fluid film formed by only a single membrane throttle, the design restricting ratio λ of which is 0.25, is disposed on the slide rail and the dimensionless stiffness $K_r*$ of the throttling membrane piece is 2.00. Referring to FIGS. 12 and 15, when the equivalent area ratio α is 0.5, 1.0, and 2.0, the dimensionless load $W/A_e p_s$ of the two sub-bearing portions 110 of the bearing 100 disposed opposite to each other allows the actual fluid film thickness h/preset fluid film thickness $h_0$ (vertical axis) to have a greater range maintained within a fixed range around 1 compared to the dimensionless load $W/A_e p_s$ of the bearing of the hydrostatic bearing module of the fluid film formed by only a single membrane throttle. In other words, in the present embodiment, a better stiffness may be obtained when the equivalent area ratio α of the two bearings 100 of the hydrostatic bearing assembly 10 disposed opposite to each other is in the range of 0.5≤α≤2.

Figure 13:
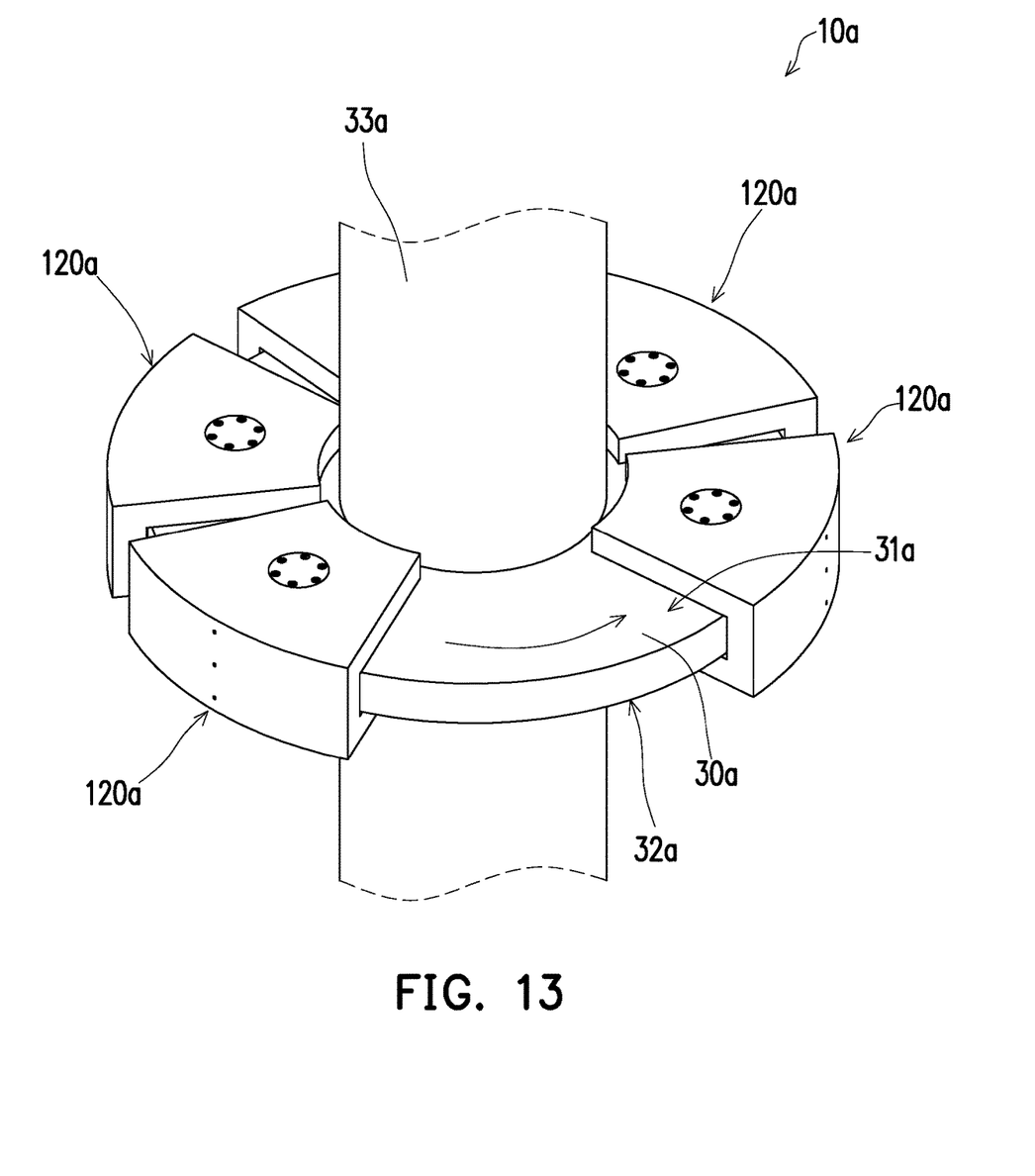
FIG. 13 is a schematic of a hydrostatic bearing assembly according to another embodiment of the disclosure.

Of course, the type of the hydrostatic bearing assembly 10 designed according to the above design parameters is not limited to FIG. 1. FIG. 13 is a schematic of a hydrostatic bearing assembly according to another embodiment of the disclosure. Referring to FIG. 13, a hydrostatic bearing assembly 10a in the present embodiment is a rotary-motion opposed-pad hydrostatic bearing. A slide rail 30a is disk-shaped and is rotated about the central axis of the disk. A plurality of hydrostatic bearing modules 120a of the hydrostatic bearing assembly 10a are disposed opposite to each other on an upper surface 31a and a lower surface 32a of the disk-shaped slide rail 30a, wherein the hydrostatic bearing modules 120a are disposed at equal angles on the periphery of the disk-shaped slide rail 30a, and these hydrostatic bearing modules 120a are adapted to be simultaneously connected to a pump (not shown). The slide rail 30a is rotated with respect to the hydrostatic bearing assembly 10a, and the slide rail 30a further includes a rotation shaft 33a located at the center and protruded from the upper surface 31a and the lower surface 32a. The hydrostatic bearing modules 120a are disposed on the disk-shaped slide rail 30a along a radial direction around the rotation shaft 33a. The rotation shaft 33a and the slide rail 30a are synchronously rotated with respect to the hydrostatic bearing assembly 10a. The load sustained by the hydrostatic bearing assembly 10a may be applied to the extended rotation shaft 33a in any form, for example, with the rotation shaft 33a as the rotation shaft of a fan. The hydrostatic bearing assembly 10a may still provide stability and smoothness when rotated with respect to the slide rail 30a under a load.

The hydrostatic bearing modules 120a may be disposed on the periphery of the disk-shaped slide rail 30a at unequal angles. Of course, these hydrostatic bearing modules 120a may also be disposed on the periphery of the disk-shaped slide rail 30a at equal angles to provide better stability. In addition, the plurality of hydrostatic bearing modules 120a expose a portion of the slide rail 30a such that the supply of fluid is smoother.

Figure 14A:
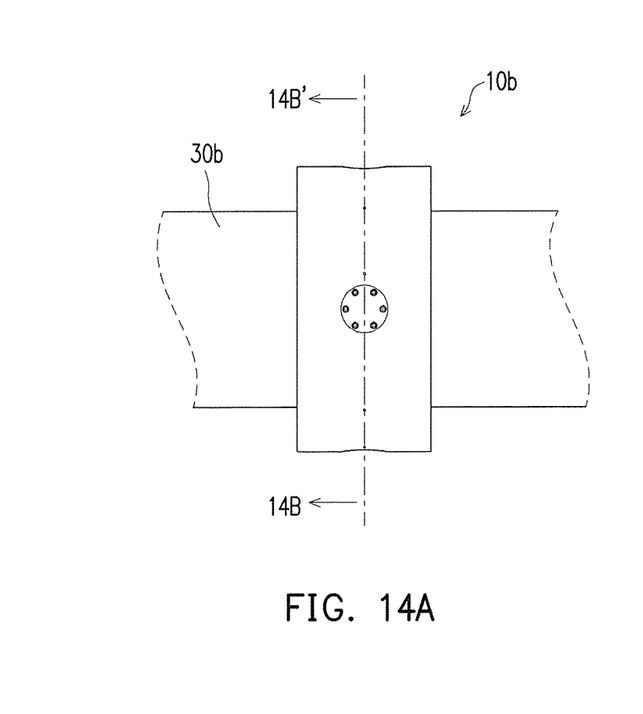
FIG. 14A is a schematic of a hydrostatic bearing assembly according to yet another embodiment of the disclosure.
Figure 14B:
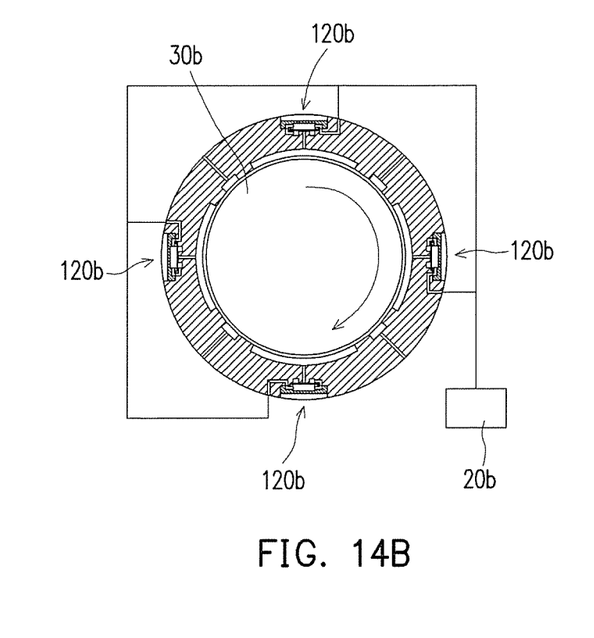
FIG. 14B is a cross section of the hydrostatic bearing assembly of still another embodiment of the disclosure shown along section line 14B-14B' of FIG. 14A.

FIG. 14A is a schematic of a hydrostatic bearing assembly according to yet another embodiment of the disclosure. FIG. 14B is a cross section of the hydrostatic bearing assembly of still another embodiment of the disclosure shown along section line 14B-14B' of FIG. 14A. Referring to FIG. 14A and FIG. 14B, a hydrostatic bearing assembly 10b in the present embodiment is a hydrostatic journal bearing assembly disposed on the periphery of a cylindrical-shaped slide rail 30b, and the slide rail 30b is rotated with respect to the hydrostatic bearing assembly 10b along the central axis of the cylinder. The sub-bearing portions of each of the hydrostatic bearing modules 120b are disposed at equal angles on the periphery of the cylindrical-shaped slide rail 30b and connected to a same pump 20b. At the same time, the sub-bearing portions of each of the hydrostatic bearing modules 120b surround and cover the cylindrical-shaped slide rail. The above configuration allows the slide rail 30b to be evenly stressed during rotation and reduces the possibility of shaking such that the stability of the hydrostatic bearing assembly 10b is increased. The disclosure only exemplarily provides a rotary motion and journal slide rail in addition. However, the mode of motion between the hydrostatic bearing assembly and the slide rail is not limited thereto.

Based on the above, when the design restricting ratio $\lambda$ is in the range of $0.25 \leq \lambda \leq 0.35$, the two membrane throttles disposed opposite to each other in the hydrostatic bearing assembly of the disclosure allows a certain fluid film thickness to be maintained between the bearing and the slide rail to provide good bearing stiffness. In addition, when the dimensionless stiffness $K_{r1}^*$ and $K_{r2}^*$ of the throttling membrane pieces of the two membrane throttles disposed opposite to each other are limited within the range of $1.33 \leq K_r^* \leq 2$ and the design restricting ratio $\lambda$ of the two membrane throttles is in the range of $0.25 \leq \lambda \leq 0.35$, better bearing stiffness is achieved, for example, the design restricting ratio $\lambda = 0.25$ and $K_r^* = 1.33$. Further, when the range of the equivalent area ratio $\alpha$ of the two sub-bearing portions disposed opposite to each other is 0.5 the opposed-pad hydrostatic bearing modules may be ensured to provide good effect. Further, the hydrostatic bearing assembly of the disclosure may be adapted to a wide variety of types of slide rails with reference to the parameters provided by the disclosure and adaptively adjusted according to the shape thereof.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hydrostatic bearing assembly connected to a pump for supplying fluid and disposed on a slide rail, the hydrostatic bearing assembly comprising:
   a bearing movably disposed on the slide rail and further comprising two sub-bearing portions disposed opposite to each other on two opposite sides of the slide rail, wherein an equivalent area ratio of the two sub-bearing portions is $\alpha$, and $0.5 \leq \alpha \leq 2$, wherein $\alpha = A_{e1}/A_{r2}$, $A_{e1}$ is an equivalent area of one of the two sub-bearing portions, and $A_{e2}$ is an equivalent area of the other of the sub-bearing portions; and
   two membrane throttles connected to the pump for supplying fluid, flowing through the two membrane throttles to flow between the two sub-bearing portions and the slide rail, each of the membrane throttles further comprising:
   a casing, at least one of the casing and a corresponding sub-bearing portion of the two sub-bearing portions further comprising a chamber, an inlet and an outlet for communicating with the chamber, and an outlet surface, wherein the pump is connected to the inlet, and the slide rail is disposed adjacent to the outlet, and
   a throttling membrane piece being positioned in the chamber and covering the outlet surface.

2. The hydrostatic bearing assembly of claim 1, wherein the casing and the corresponding sub-bearing portion together form the chamber.

3. The hydrostatic bearing assembly of claim 1, wherein the casing forms the chamber, the corresponding sub-bearing portion has a perforation, and the casing is located in the perforation.

4. The hydrostatic bearing assembly of claim 1, wherein the two sub-bearing portions respectively comprise two fluid chambers, and the two fluid chambers of the two sub-bearing portions are at least partially overlapped when projected onto an upper surface or a lower surface of the slide rail.

5. The hydrostatic bearing assembly of claim 1, wherein the outlet of one of the membrane throttles and the outlet of the other of the membrane throttles are located on a straight line.

6. The hydrostatic bearing assembly of claim 1, wherein the membrane throttle has a protruding portion protruded toward the throttling membrane piece, the outlet is penetrated through the protruding portion, the outlet surface is formed on the protruding portion, and a distance between the outlet surface and the throttling membrane piece is less than a distance between a bottom surface inside the casing surrounding the protruding portion and the throttling membrane piece.

7. The hydrostatic bearing assembly of claim 1, wherein a design restricting ratio of the membrane throttle is $\lambda$, $0.1 \leq \lambda \leq 1.0$, wherein $\lambda = R_{r1}/R_0$, $R_{r1}$ is a flow resistance of the fluid flowing through the outlet surface when a distance between the throttling membrane piece and the outlet surface is $L_0$, and $R_0$ is a preset flow resistance of the fluid flowing through the bearing.

8. The hydrostatic bearing assembly of claim 7, wherein the design restricting ratio $\lambda$ of the membrane throttle is $0.25 \leq \lambda \leq 0.35$.

9. The hydrostatic bearing assembly of claim 7, wherein the design restricting ratio $\lambda$ of the membrane throttle is 0.25.

10. The hydrostatic bearing assembly of claim 1, wherein a dimensionless stiffness of the throttling membrane piece is $K_r^*$ and $1.33 \leq K_r^* \leq$, wherein $K_r^* = K_r L_0 / (p_s A_r)$, $K_r$ is a stiffness of the throttling membrane piece, $L_0$ is a distance between the throttling membrane piece and the outlet surface when the pump is not started, which is also called a membrane assembling clearance, $p_s$ is a hydraulic pressure supplied by the pump, and $A_r$ is an effective area of the outlet surface.

11. The hydrostatic bearing assembly of claim 10, wherein the dimensionless stiffness $K_r^*$ of the membrane throttle is 1.33.

12. The hydrostatic bearing assembly of claim 1, wherein the equivalent area ratio $\alpha$ of the two sub-bearing portions is 1.

13. The hydrostatic bearing assembly of claim 1, wherein the hydrostatic bearing assembly is a linear-motion opposed-pad hydrostatic bearing assembly adapted to be disposed on an upper surface and a lower surface of the slide rail extended along an axial direction, and is adapted to perform a linear motion with respect to the slide rail.

14. The hydrostatic bearing assembly of claim 1, wherein the hydrostatic bearing assembly is a rotary-motion opposed-pad hydrostatic bearing assembly and is adapted to be disposed on an upper surface and a lower surface of the slide rail having a disk shape, and the slide rail is adapted to be rotated with respect to the hydrostatic bearing assembly.

15. The hydrostatic bearing assembly of claim 14, wherein the slide rail having the disk shape comprises a rotating shaft located at a center and protruded from at least one of the upper surface and the lower surface, the hydrostatic bearing assembly comprises a plurality of hydrostatic bearing modules, and the hydrostatic bearing modules are disposed on the slide rail having the disk shape along a radial direction around the rotating shaft.

16. The hydrostatic bearing assembly of claim 14, wherein the hydrostatic bearing assembly comprises a plurality of hydrostatic bearing modules disposed at equal angles on a periphery of the slide rail having the disk shape, and the hydrostatic bearing modules are adapted to be connected to the pump.

17. The hydrostatic bearing assembly of claim 14, wherein the hydrostatic bearing assembly comprises a plurality of hydrostatic bearing modules disposed at unequal angles on a periphery of the slide rail having the disk shape.

18. The hydrostatic bearing assembly of claim 1, wherein the hydrostatic bearing assembly is a hydrostatic journal bearing assembly adapted to be disposed on a periphery of the slide rail having a cylindrical shape, and the slide rail is adapted to be rotated with respect to the hydrostatic bearing assembly.

19. The hydrostatic bearing assembly of claim 18, wherein the hydrostatic bearing assembly comprises a plurality of hydrostatic bearing modules, the sub-bearing portions of the hydrostatic bearing modules are disposed at equal angles on the periphery of the slide rail having the cylindrical shape, and the hydrostatic bearing modules are adapted to be connected to the pump at the same time.

20. The hydrostatic bearing assembly of claim 18, wherein the sub-bearing portions surround and cover the periphery of the slide rail having the cylindrical shape.

* * * * *